Patented Oct. 27, 1953

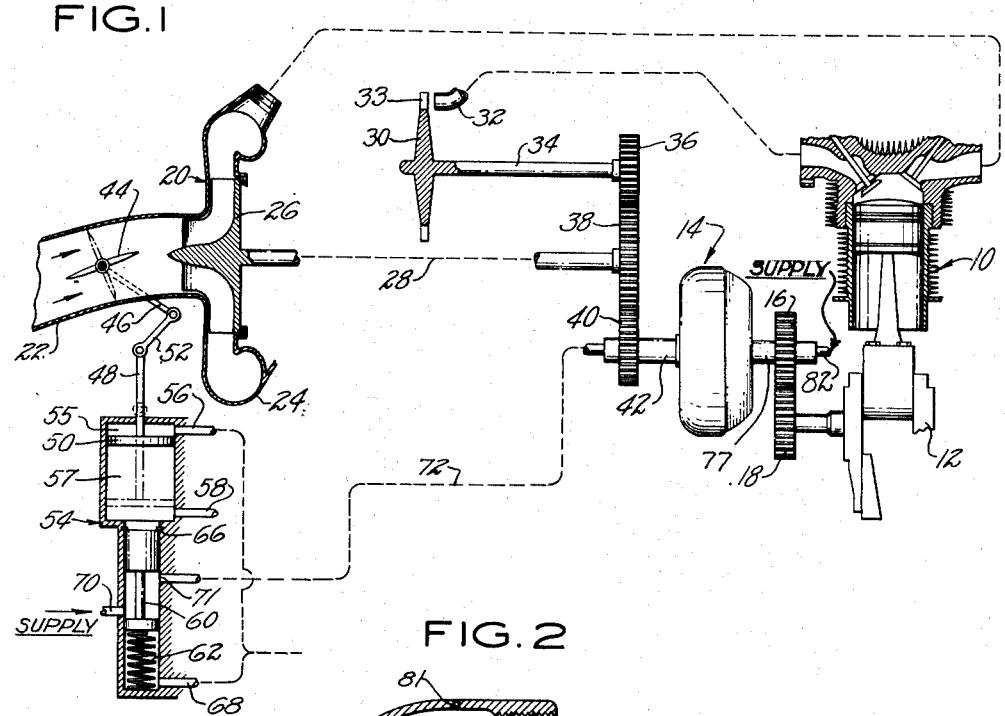
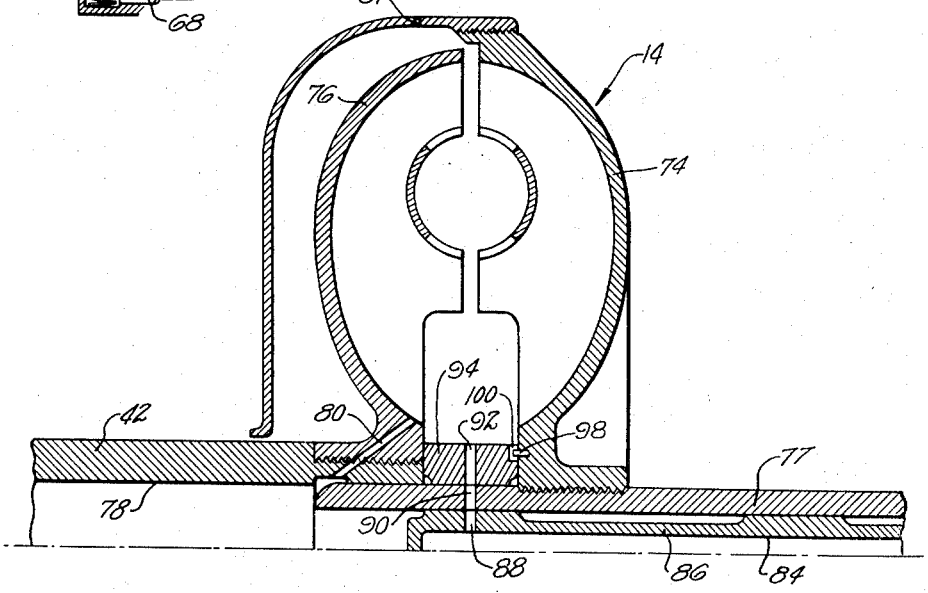

2,656,675

UNITED STATES PATENT OFFICE 2,656,675

AUTOMATIC CONTROL SYSTEM FOR FEEDBACK TURBINES

Richard J. Coar, Hartford, Conn., assignor to United Aircraft Corporation, East Hartford, Conn., a corporation of Delaware Application December 30, 1949, Serial No. 135,969

6 Claims. (Cl. 60—13)

This invention relates to exhaust driven superchargers for internal combustion engines and has for one of its objects to provide a novel and improved system for assuring continued operation of the supercharger when the turbine driving the supercharger is inoperative.

In internal combustion engine arrangements of the type with which this invention is adapted to be used, an exhaust driven turbine is employed for driving the supercharger impeller. Through the greater portion of the operating range of the engine the power developed by the turbine is greater than that required for driving the impeller. This energy can be fed back into the engine, and by the use of a hydraulic coupling the turbine energy can be proportioned between the supercharger and the engine. By controlling the quantity of fluid within the coupling, a greater or a less amount of turbine energy can be used for driving the supercharger impeller. If turbine energy should become deficient for driving the impeller faster than it would be driven by the engine, this invention provides a positive supply of fluid for the coupling in order that the impeller may be driven through the coupling by the engine.

An object of this invention is to provide for operation of an exhaust driven supercharger when the turbine is ineffective.

Another object of this invention is to provide a fluid supply to a feedback coupling when the turbine driving the engine supercharger becomes ineffective so that the engine can drive the supercharger through the coupling.

Other objects and advantages will be apparent from the specification and claims and from the accompanying drawing which illustrates an embodiment of the invention.

Fig. 1 is a diagrammatic view of an internal combustion engine arrangement having an exhaust driven supercharger and a feedback coupling.

Fig. 2 is a fragmentary sectional view of the feedback coupling illustrating the two fluid supplies and the slip-sensitive valve.

Referring to the drawing in detail, in Fig. 1 an internal combustion engine is indicated generally at 10, the engine having a crankshaft 12 connected to a hydraulic feedback coupling 14 through gears 16 and 18. A supercharger 20 for the engine is located in air inlet 22, the supercharger consisting of a diffuser case 24, and an impeller 26 mounted on shaft 28. The impeller is driven by a turbine 30 which receives its energy from the exhaust gases from the engine 10. These gases are carried by collector 32 to the turbine where they impinge upon blades 33. The turbine is mounted on shaft 34 and is connected to impeller 26 through gears 36 and 38 on shafts 34 and 28 respectively. The turbine and impeller in turn are connected by means of gear 40 and shaft 42 to the feedback coupling 14.

A throttle 44 is mounted within air inlet 22, the position of the throttle being adjusted by a conventional manifold pressure regulator, only a portion of which is shown. This regulator adjusts the position of the throttle 44 in accordance with impeller discharge pressure, usually referred to as manifold pressure. The throttle has arm 46 connected to stem 48 of servo-piston 50 by means of link 52. The servo-piston is carried in housing 54 which is part of the manifold pressure regulator, the piston being subjected on either side to fluid metered by the regulator. When the regulator calls for less manifold pressure, fluid is admitted to chamber 55 from servo-decrease line 56 causing the piston 50 to move in a direction closing the throttle 44. When the regulator calls for more manifold pressure, fluid is admitted to chamber 57 from servo-increase line 58 causing the piston to move in a direction opening the throttle. Such an arrangement is well known in the art, a similar device being shown in Dodson Patent No. 1,995,800, dated March 26, 1935, for a Throttle Control for Supercharged Aircraft Engines.

Servo-valve 60 in the lower portion of housing 54 controls one fluid supply to coupling 14. This valve is biased by spring 62 which normally holds it against stop 66. In addition to this spring force, the piston is subjected to servo-decrease pressure by line 68 which is connected to line 56. Coupling fluid is admitted to the valve through conduit 70 from a source not shown, preferably a pump driven by the engine, and is metered to the coupling 14 through port 71 and conduit 72, the valve 60 regulating the port area as later described.

Referring now to Fig. 2, the coupling 14 has two rotating elements 74 and 76, runner 74 being connected to and rotatable with shaft 77 which is driven by the engine 10. Coupling impeller 76 is connected to and rotatable with shaft 42. Working fluid from conduit 72 is introduced to the coupling through bore 78 in shaft 42 and passage 80 in coupling element 76 and shaft 42. The coupling casing has one or more bleeds 81 to drain the coupling, and to prevent overheating during operation by providing for a flow of fluid therethrough. The torque transmitted from one half of the coupling to the other is determined by the fluid level in the coupling which in turn is controlled by the rate of flow of fluid into the coupling.

A second supply of fluid, preferably also from the engine-driven pump, is admitted to the coupling through conduit 82 and bore 84 in sleeve 86 carried within shaft 77. Sleeve 86 separates the fluid supply in bore 78 from the supply in bore 84. From bore 84 the fluid passes through openings 88 and 90 in the sleeve and shaft, respectively, and into the coupling through port 92 in slip-sensitive valve 94. A valve of this type is fully disposed and described in Hobbs et al. Patent No. 2,400,307, dated May 14, 1946, for Variable Speed Drive.

During part-throttle operation the valve 60 is maintained against the stop 66 by the force of spring 62 and servo-decrease pressure in line 68. The valve will remain in this position until the servo-piston 50 has reached its limit of travel in an upward direction, the throttle 44 then being fully opened. During such operation the coupling 14 is supplied with fluid through conduit 72, the flow through port 71 not being restricted and the turbine energy in excess of that required to drive the impeller 26 will be fed back into the engine 10 through the coupling 14.

After full throttle has been reached and there is a demand for further engine supercharging, servo-increase pressure from line 58 will, since the piston 50 has reached its limit of travel, cause the valve 60 to start moving in a direction to restrict port 71. This reduces the fluid supply to the coupling 14 and a proportionately greater amount of the turbine energy is available to drive the impeller 26. The speed of the impeller increases, resulting in an increase in engine supercharging. It is obvious that when full-throttle has been reached and when the fluid supply to the coupling through conduit 72 has been completely shut off, the engine will be receiving the maximum supercharging available.

When turbine energy exceeds that required to maintain the desired engine supercharging, power is being fed back into the engine and coupling impeller 76 is being driven at a faster rate of rotation than coupling runner 74 due to the slip in the coupling. The action of impeller 76 will cause the slip-sensitive valve 94 to rotate with respect to runner 74 and shaft 77 sufficiently far to mask opening 90 and cut off the fluid supply to the coupling through port 92. Pin 98 in element 74 cooperates with a groove 100 in the face of valve 94 to limit the angular displacement of the valve relative to the opening 90.

If at full throttle with port 71 closed, the turbine 30 should become inoperative due to failure of any of the blades 33 or failure of the shaft 34, or if the energy in the exhaust gases in collector 32 is insufficient to cause coupling impeller 76 to be driven at a speed equal to or greater than that of runner 74, valve 94 will be displaced angularly with respect to element 74, bringing port 92 and opening 90 into alignment to admit fluid from bore 84 to the coupling. The presence of fluid within the coupling will result in the supercharger impeller 26 being driven by the engine 10. Thus, an inoperative condition of the turbine 30 does not limit the engine to low powers due to loss of supercharging since a positive supply of fluid to the coupling is provided so that the engine will drive the supercharger impeller when the turbine will not drive it as fast as it would be driven by the engine.

It is to be understood that the invention is not limited to the specific embodiment herein illustrated and described but may be used in other ways without departure from its spirit as defined by the following claims.

I claim:

1. An improved hydraulic coupling for a feedback turbine installation which includes an internal combustion engine, an impeller, a turbine driving said impeller, said coupling connecting the engine to the impeller and the turbine and having the feature of two independent oil supply means including means for proportioning turbine energy between said impeller and said engine and means for driving said impeller by said engine when said turbine will not drive said impeller faster than it would be driven by said engine.

2. An improved hydraulic coupling for a feedback turbine installation which includes an internal combustion engine, an impeller for supercharging said engine and a turbine for driving said impeller, said coupling connecting the engine to the impeller and the turbine and having the feature of two independent oil supplies, the first supply being regulated as a function of supercharging requirement, and a slip-sensitive valve in said coupling, said valve admitting fluid from the second supply when impeller speed is less than it would be if driven by said engine.

3. An improved hydraulic coupling for a feedback turbine installation which includes an internal combustion engine, an impeller for supercharging said engine, a turbine driven by the exhaust gases from said engine for driving said impeller, a throttle control, said coupling connecting the engine to the impeller and the turbine and having the feature of two independent fluid supplies and a slip-sensitive valve, the first supply being controlled by said throttle control and the second supply being controlled by the slip-sensitive valve.

4. An improved hydraulic coupling for a feedback turbine installation which includes an internal combustion engine, an impeller for supercharging said engine, a turbine driven by the exhaust gases from said engine for driving said impeller, a throttle control, a fluid supply to said coupling controlled by said throttle control, said coupling connecting the engine to the impeller and the turbine and having the feature of a fluid supply independent of said throttle controlled supply, and a slip-sensitive valve for admitting fluid from said independent supply to said coupling when said engine will drive said impeller faster than it is being driven by said turbine.

5. An improved hydraulic coupling for a feedback turbine installation which includes an internal combustion engine, an impeller for supercharging said engine, a turbine driven by the exhaust gases from said engine for driving said impeller, the coupling connecting the engine to the impeller and the turbine, a throttle upstream of said impeller, a throttle control, a fluid supply to said coupling, a valve associated with said throttle control for controlling said fluid supply, said valve reducing said fluid supply to said coupling in response to an increase in supercharging requirements after said throttle is fully opened, said coupling having the feature of a second fluid supply independent of said throttle controlled supply, and means for admitting fluid from said independent supply to said coupling when said turbine fails to drive said impeller as fast as it would be driven by said engine through said coupling.

6. An improved hydraulic coupling for a feedback turbine installation which includes an internal combustion engine, an impeller for supercharging said engine, a turbine driven by exhaust gases from said engine for driving said impeller, a throttle control regulating air flow to said impeller, a fluid supply to said coupling controlled by said throttle control, said coupling having an impeller connected to said turbine and a runner connected to said engine, a fluid supply independent of said throttle controlled supply, and a slip-sensitive valve which shuts off said independent fluid supply to said coupling when coupling impeller speed exceeds coupling runner speed and admits fluid from said independent supply to said coupling when coupling runner speed exceeds coupling impeller speed.

RICHARD J. COAR.

References Cited in the file of this patent

UNITED STATES PATENTS

| Number | Name | Date |
|---|---|---|
| 2,278,181 | Lieberherr | Mar. 31, 1942 |
| 2,400,307 | Hobbs et al. | May 14, 1946 |
| 2,402,725 | Birkigt | June 25, 1946 |

FOREIGN PATENTS

| Number | Country | Date |
|---|---|---|
| 584,056 | Great Britain | Jan. 6, 1947 |